US011104462B2

(12) United States Patent
Costa et al.

(10) Patent No.: US 11,104,462 B2
(45) Date of Patent: Aug. 31, 2021

(54) GUIDING DEVICE (71) Applicant: Tetra Laval Holdings & Finance S.A., Pully (CH)

(72) Inventors: Stefano Costa, Casalmaggiore (IT); John Richard Pedretti, Formigine (IT); Luciano Amidei, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 75 days.

(21) Appl. No.: 16/470,577

(22) PCT Filed: Mar. 14, 2018

(86) PCT No.: PCT/EP2018/056395
§ 371 (c)(1),
(2) Date: Jun. 18, 2019

(87) PCT Pub. No.: WO2018/172158
PCT Pub. Date: Sep. 27, 2018

(65) Prior Publication Data
US 2020/0001518 A1 Jan. 2, 2020

(30) Foreign Application Priority Data
Mar. 23, 2017 (EP) .................................. 17162470

(51) Int. Cl.
*B65B 41/16* (2006.01)
*B65B 9/20* (2012.01)
(Continued)

(52) U.S. Cl.
CPC .............. *B65B 41/16* (2013.01); *B29C 53/54* (2013.01); *B65B 9/2035* (2013.01); *B65B 9/207* (2013.01);
(Continued)

(58) Field of Classification Search
CPC ....... B65B 9/20; B65B 9/2021; B65B 9/2028; B65B 9/2035; B65B 9/207; B65B 9/22;
(Continued)

(56) References Cited

U.S. PATENT DOCUMENTS 6,052,970 A * 4/2000 Fujimoto et al. ..... B65B 9/2035
53/451
6,397,557 B1 * 6/2002 Bassissi et al. ....... B65B 9/2035
53/51
(Continued)

FOREIGN PATENT DOCUMENTS

EP 0903292 A1 3/1999
EP 1116659 A1 7/2001
(Continued)

OTHER PUBLICATIONS

International Search Report and Written Opinion in corresponding PCT Application No. PCT/EP2018/056395 dated Nov. 23, 2018 (15 pages).

*Primary Examiner* — Stephen F. Gerrity
(74) *Attorney, Agent, or Firm* — Finnegan, Henderson, Farabow, Garrett & Dunner, LLP (57) ABSTRACT

A guiding device for guiding a sheet of packaging material in a packaging machine for producing sealed packages includes: a plurality of folding rollers defining a passage for the sheet of packaging material, the passage having a longitudinal axis, wherein the plurality of folding rollers are configured to cause a first longitudinal edge of the sheet of packaging material to superimpose to a second longitudinal edge of the sheet of packaging material, opposite the first longitudinal edge, wherein the first longitudinal edge and the second longitudinal edge define an overlapping area having an extension, wherein the plurality of folding rollers include: a group of first folding rollers configured to rotate around first rotation axes, and at least one second folding roller
(Continued)

configured to rotate around a second rotation axis, and a driving arrangement configured to move the at least one second folding roller towards and away from the longitudinal axis.

14 Claims, 5 Drawing Sheets (51) Int. Cl.
  *B65B 9/207*  (2012.01)
  *B65B 9/22*  (2006.01)
  *B65B 57/04*  (2006.01)
  *B65B 59/00*  (2006.01)
  *B29C 53/54*  (2006.01)
  *B65B 41/18*  (2006.01)

(52) U.S. Cl.
  CPC ............... *B65B 9/22* (2013.01); *B65B 41/18* (2013.01); *B65B 57/04* (2013.01); *B65B 59/003* (2019.05)

(58) Field of Classification Search
  CPC ......... B65B 41/16; B65B 41/18; B65B 57/04; B65B 59/003; B29C 53/54
  USPC .................. 53/51, 64, 551, 389.4; 493/302
  See application file for complete search history.

(56) References Cited

U.S. PATENT DOCUMENTS

| 7,827,768 B2* | 11/2010 | Rosberg et al. .......... B65B 9/20 53/452 |
| 2005/0016124 A1* | 1/2005 | Kinoshita ............. B65B 9/2035 53/64 |
| 2011/0036062 A1* | 2/2011 | Borsari et al. ............ B65B 9/20 53/548 |

FOREIGN PATENT DOCUMENTS

| EP | 1172299 A1 | 1/2002 | |
| EP | 2143643 A1 | 1/2010 | |
| WO | WO 00/41932 A1 | 7/2000 | |
| WO | WO 2009/067065 A1 | 5/2009 | |
| WO | WQ-2009070077 A1 * | 6/2009 | ........... B65B 9/2035 |
| WO | WO 2009/154532 A1 | 12/2009 | |

* cited by examiner

GUIDING DEVICE

CROSS-REFERENCE TO RELATED PATENT APPLICATIONS

This is a National Phase of International Application No. PCT/EP2018/056395, filed Mar. 14, 2018, which claims the benefit of European Application No. 17162470.3 filed Mar. 23, 2017. The entire contents of the above-referenced applications are expressly incorporated herein by reference.

TECHNICAL FIELD

The present invention relates to a guiding device for guiding a sheet of packaging material in a packaging machine for producing sealed packages.

In particular, the guiding device may be used in a packaging machine for producing sealed packages of a food product from a tube obtained from the sheet of packaging material.

BACKGROUND ART

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing a sheet of packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a tube is formed continuously from the sheet of packaging material. More specifically, the sheet of packaging material is unwound off a reel and fed through a sterilization unit of the packaging machine, where it is sterilized, e.g. by applying a sterilizing agent such as hydrogen peroxide, which is subsequently evaporated by heating, and/or by subjecting the sheet of packaging material to radiation of appropriate wavelength and intensity.

The sheet of packaging material is then fed through an aseptic chamber, where it is maintained in a sterile-air environment, and through a number of guiding assemblies which interact with the packaging material to fold it gradually from a web form into a tube shape.

The guiding assemblies are arranged in succession, and comprise respective folding members defining a number of compulsory passages for the packaging material varying gradually in section from a C shape to a substantially circular shape.

The guiding assemblies comprise a guiding device having a plurality of folding rollers rotating around rotation axes arranged in a common plane. In particular, the common plane is a horizontal plane.

On interacting with the folding members, a first longitudinal edge of the sheet of packaging material is superimposed to a second longitudinal edge of the sheet of packaging material, opposite the first longitudinal edge.

Subsequently, the first longitudinal edge and second longitudinal edge are sealed together to form a longitudinal seal along the tube.

The tube is then filled with the sterilized or pasteurized food product and is sealed and cut along equally spaced cross sections to form pillow packs, which are then folded mechanically to form respective parallelepiped-shaped packages.

When the first longitudinal edge is superimposed to the second longitudinal edge an overlapping area is defined. It is extremely important to control the extension, i.e. width, of the overlapping area in order to guarantee a good longitudinal sealing of the tube and a correct weight of the packages being formed.

Moreover, the face of the sheet of packaging material intended to define the outer panels of the packages to be formed is normally printed, for example with images or written information concerning the product packed in the packages.

If the extension of the overlapping area is too wide, or too narrow, the packages may have a bad appearance, since the printing arranged at the first longitudinal edge does not match with the printing arranged at the second longitudinal edge.

In addition, since the operations of forming the tube and longitudinally sealing the tube are carried out continuously, it is extremely important that the extension of the overlapping area is kept as constant as possible during a working cycle of the packaging machine.

In the known packaging machines, the extension of the overlapping area is controlled by replacing the folding rollers with further folding rollers having diameters different from the diameters of the folding rollers. In particular, if the extension of the overlapping area has to be reduced, the further folding rollers have diameters that are smaller than the diameters of the folding rollers. On the contrary, if the extension of the overlapping area has to be increased, the further folding rollers have diameters that are bigger than the diameters of the folding rollers.

A drawback of the known guiding devices is that the replacement of the folding rollers with the further folding rollers is rather time consuming and requires stopping the packaging machine, which adversely affects the efficiency of the packaging machine.

Another drawback of the known guiding devices is that there is the risk that the tube of packaging material is "pinched" between two adjacent folding rollers, which may cause defects to the packages being formed.

DISCLOSURE OF INVENTION

It is an object of the invention to improve the guiding devices for guiding a sheet of packaging material in a packaging machine for producing sealed packages. It is another object of the invention to provide a guiding device for guiding a sheet of packaging material in a packaging machine for producing sealed packages, in which the extension of an overlapping area defined by superimposed opposite longitudinal edges of the sheet of packaging material may be controlled in an accurate and simple way.

It is another object of the invention to provide a guiding device for guiding a sheet of packaging material in a packaging machine for producing sealed packages, in which the extension of an overlapping area defined by superimposed opposite longitudinal edges of the sheet of packaging material may be controlled without stopping the packaging machine.

It is another object of the invention to provide a guiding device for guiding a sheet of packaging material in a packaging machine for producing sealed packages, in which the risk that the sheet of packaging material is damaged by the guiding device is very limited.

According to the invention there is provided a guiding device for guiding a sheet of packaging material in a packaging machine for producing sealed packages, said guiding device comprising a plurality of folding rollers defining a passage for said sheet of packaging material and causing a first longitudinal edge of said sheet of packaging material to superimpose to a second longitudinal edge of said sheet of packaging material, opposite said first longitudinal edge, to define an overlapping area of said first longitudinal edge and said second longitudinal edge, said overlapping area having a certain extension, said passage having a longitudinal axis, said plurality of folding rollers comprising a group of first folding rollers rotatable around first rotation axes arranged in a common first plane, characterized in that said plurality of folding rollers comprises at least one second folding roller rotatable around a second rotation axis arranged in a second plane, different from said first plane, said guiding device further comprising a driving arrangement for moving said at least one second folding roller towards and away from said longitudinal axis of said passage so as to control the extension of said overlapping area.

Owing to the invention, by moving the at least one second folding roller towards and away from the axis of the passage, it is possible to increase or decrease the extension of the overlapping area.

This is particularly advantageous, since the width of the overlapping area can be changed without stopping the packaging machine.

In an embodiment, the first folding rollers define a C-shaped arrangement, a gap being defined between opposite ends of the C-shaped arrangement. The at least one second folding roller is arranged at the gap of the C-shaped arrangement, but in a different plane with respect to the first folding rollers, so as to guide the tube of packaging material without closing the gap of the C-shaped arrangement. In this way, the risk that the guiding device pinches the tube of packaging material is highly reduced, since the tube of packaging material can be partially received within the gap, which prevents the tube of packaging material from being clamped between the first folding rollers that define the ends of the C-shaped arrangement and the at least one second folding roller. In other words, the gap in the C-shaped arrangement and the fact that the first folding rollers and the at least one second folding rollers are arranged in different planes prevent an excessive pressure inside the tube, and therefore the risk that the tube gets trapped between two adjacent rollers, as in the known guiding devices.

In an embodiment, the guiding device also comprises a sensor, which detects the extension of the overlapping area, and a motor device, connected to the sensor, which actuates the driving arrangement. In this case, if the extension of the overlapping area, as detected by the sensor, differs from a nominal extension of the overlapping area, the motor device actuates the driving arrangement—based on a signal generated by the sensor—so as to adjust the extension of the overlapping area and recover the offset.

BRIEF DESCRIPTION OF THE DRAWINGS

A preferred, non-limiting embodiment of the present invention will be described by way of example with reference to the accompanying drawings, in which.

BEST MODES FOR CARRYING OUT THE INVENTION

Figure 1:
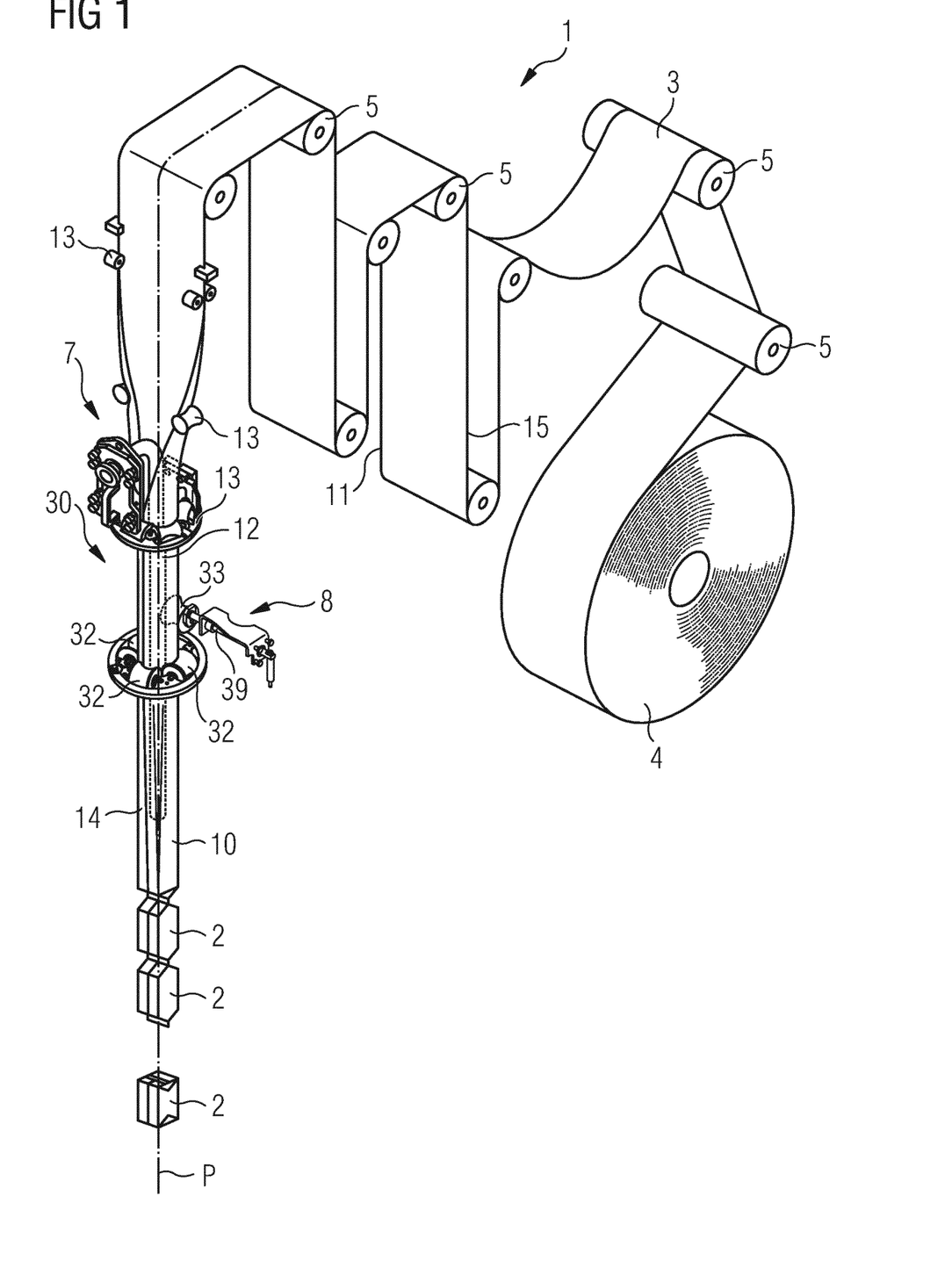
FIG. 1 is a perspective schematic view of a packaging machine for producing sealed packages from a sheet of packaging material, the packaging machine comprising a guiding device according to the invention.
Figure 2:
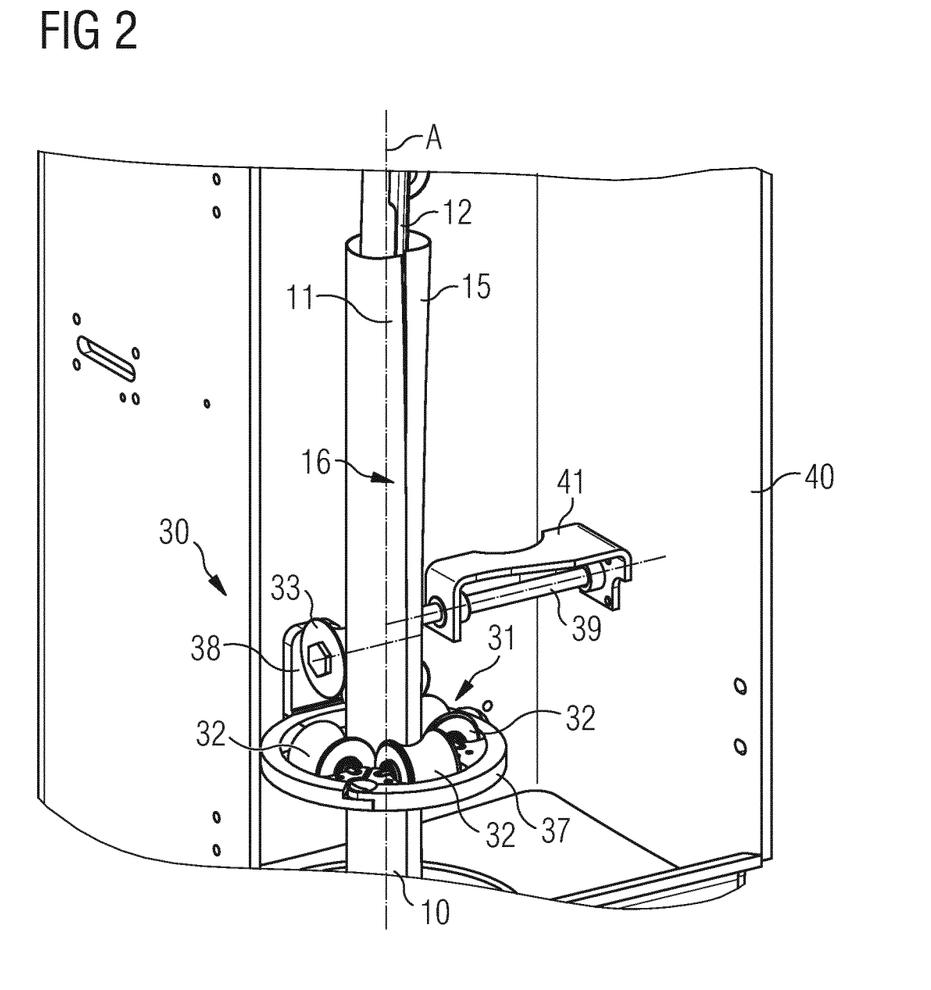
FIG. 2 is a perspective view of the guiding device according to the invention.
Figure 3:
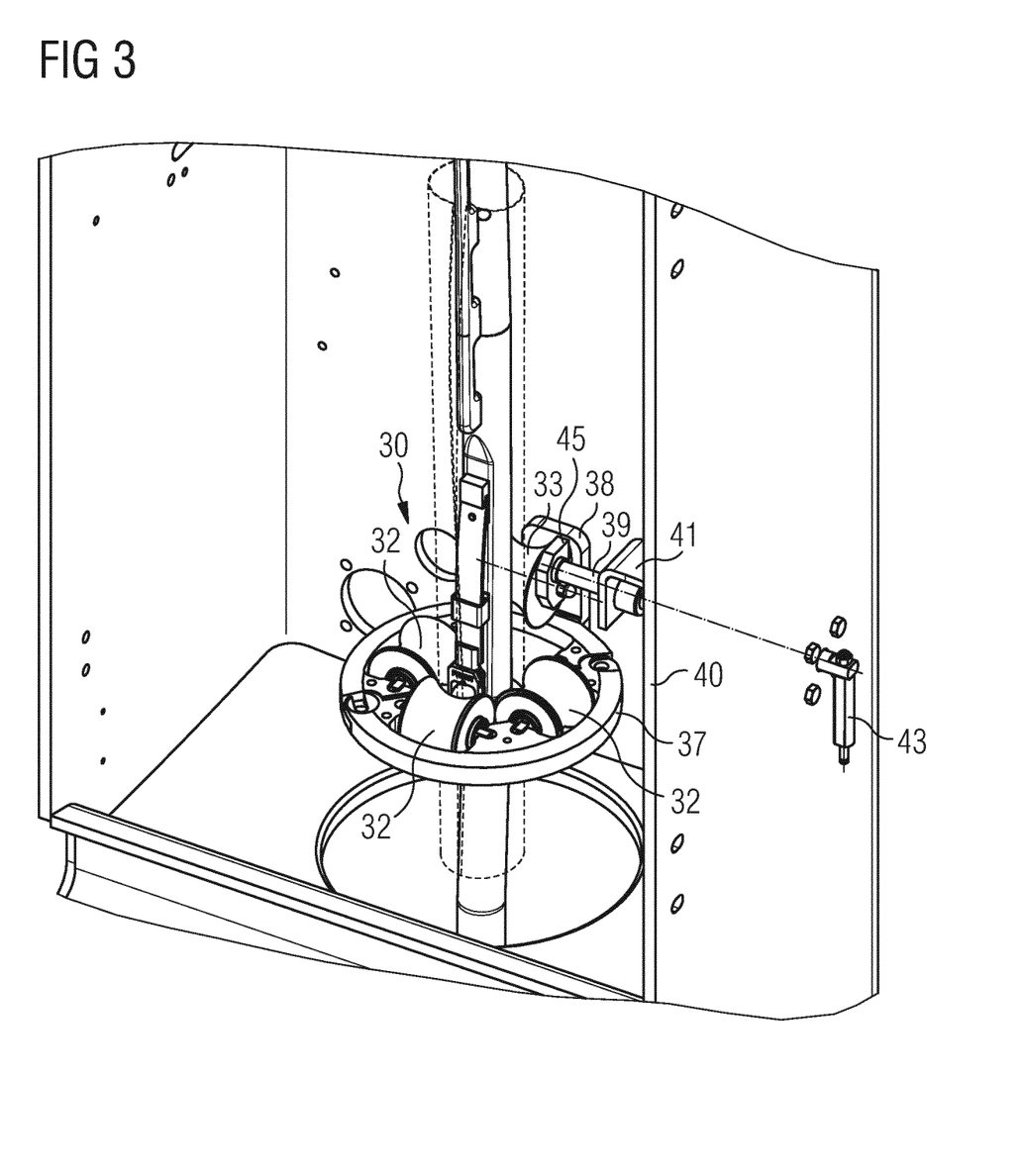
FIG. 3 is another perspective view of the guiding device of FIG. 2.
Figure 4:
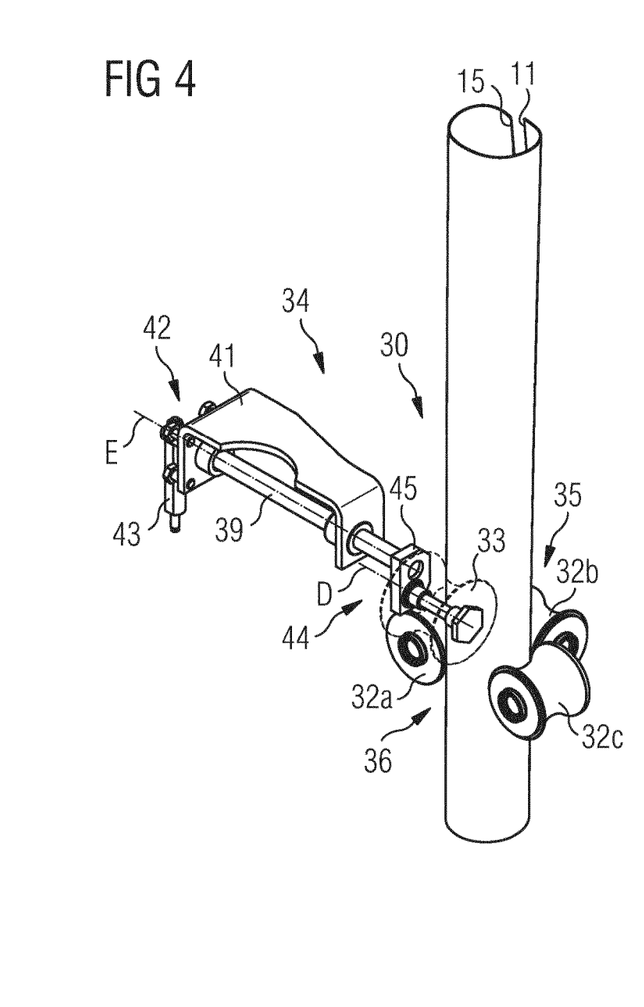
FIG. 4 is a perspective view with parts removed for clarity of the guiding device of FIG. 2.
Figure 5:
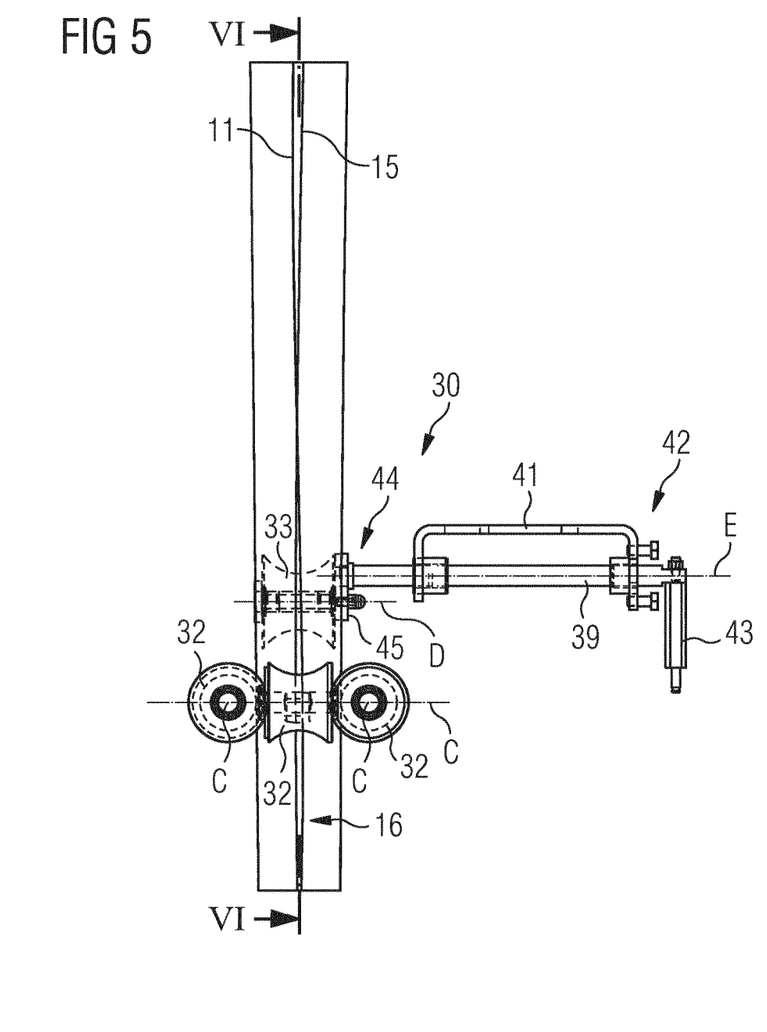
FIG. 5 is a longitudinal cross section of the guiding device of FIG. 4.
Figure 6:
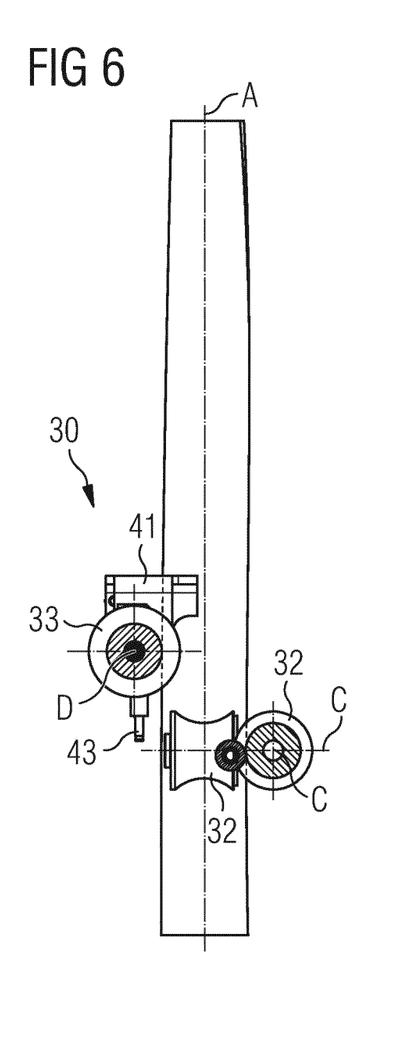
FIG. 6 is a section taken along plane VI-VI of FIG. 5, which shows the guiding device in a working configuration.

FIG. 1 shows a packaging machine 1 for continuously producing sealed packages 2 from a sheet of packaging material 3, which is unwound off a reel 4 and fed along a forming path P.

The packaging machine 1 preferably produces sealed packages 2 of a pourable food product, such as pasteurized or UHT milk, fruit juice, wine, peas, beans, etc.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

More specifically, the sheet of packaging material 3 is fed along the forming path P by guide members 5, e.g. rollers or similar.

The packaging machine 1 comprises a folding assembly 7 for progressively folding the sheet of packaging material 3.

The packaging machine further comprises a sealing station 8 for longitudinally sealing the tube 10 so as to form a longitudinal seal 14 along the tube 10.

The packaging machine 1 also comprises a filling device 12 for pouring the sterilized or sterile-processed food product continuously into the tube 10.

The packaging machine 1 further comprises a jaw-type forming assembly (not shown) for gripping, transversely sealing, and cutting the tube 10 along equally spaced cross sections to form a succession of packages 2.

The folding assembly 7 comprises a number of folding elements 13 arranged successively along the forming path P, and which interact gradually with the sheet of packaging material 3 to fold the sheet of packaging material 3 into the form of a tube 10.

In particular, the folding elements 13 form the tube 10 on such a way that a first longitudinal edge 11 of the sheet of packaging material 3 is located outwards of a second longitudinal edge 15 of the sheet of packaging material 3, opposite the first longitudinal edge 11, with respect to an axis of the tube 10.

The sealing station 8 comprises heating means (not shown) for heating the first longitudinal edge 11 and locally melting the polyethylene layer of the first longitudinal edge 11. The heat is transmitted by conduction from the first longitudinal edge 11 to the second longitudinal edge 15, so as to locally melt the polyethylene layer of the second longitudinal edge 15.

The first longitudinal edge 11 and the second longitudinal edge 15 are then pressed together to obtain the longitudinal seal 14.

With reference to FIGS. 2 to 8, the folding assembly 7 comprises a guiding device 30 comprising a plurality of folding rollers defining a passage 31 for the sheet of packaging material 30, i.e. for the tube 10 being formed.

In particular, the guiding device 30 folds the sheet of packaging material 3 so as to superimpose the first longitudinal edge 11 of the sheet of packaging material 3 to the second longitudinal edge 15 of the sheet of packaging material 3 in order to obtain an overlapping area 16 having a certain extension.

The passage 31 has a longitudinal axis A.

The plurality of folding rollers comprises a group of first folding rollers 32 rotating around first rotation axes C arranged in a common first plane and a second folding roller 33 rotating around a second rotation axis D arranged in a second plane, the second plane being different, i.e. distinct, from the first plane.

In the embodiment shown, the first plane is parallel to the second plane.

In the embodiment shown, the first plane and the second plane are horizontal and are arranged at a preset distance from one another.

In the embodiment shown, the second plane is arranged upstream of the first plane along the forming path P. In this way, the second folding roller 33 is arranged above the first folding rollers 32 along a vertical direction. In the embodiment shown, the second folding roller 33 interacts with a portion of the tube 10 opposite the overlapping area 16.

The first folding rollers 32 are rotatably supported by a supporting element 37 surrounding the tube 10.

The first folding rollers 32 are idle.

The supporting element 37 has the shape of a ring.

Each of the first folding rollers 32 has a minimum diameter at a central plane perpendicular to the respective first rotation axis C and a maximum diameter at opposed axial ends. The diameter decreases moving from the axial ends towards the central plane.

The second folding roller 33 is rotatably supported by a supporting body 38.

The second folding roller 33 is idle.

The supporting body 38 is connected to the supporting element 37.

The second folding roller 33 has a minimum diameter at a central plane perpendicular to the second rotation axis D and a maximum diameter at opposed axial ends. The diameter decreases moving from the axial ends towards the central plane.

The guiding device 30 further comprises a driving arrangement 34 for moving the second folding roller 33 towards and away from the longitudinal axis A so as to change the extension of the overlapping area 16.

By moving the second folding roller 33 towards and away from the axis of the passage 31, it is possible to increase or decrease the extension of the overlapping area 16.

In this way, the extension of the overlapping area can be precisely controlled.

In particular, since—owing to the invention—the extension of the overlapping area corresponds to a nominal extension of the overlapping area, it is possible to have a good longitudinal seal.

In addition, it is possible to produce packages having a weight that corresponds to a nominal weight, since the diameter of the tube (and the internal volume of the tube), which depends on the extension of the overlapping area, may be kept substantially constant.

The first folding rollers define a C-shaped arrangement 35 and a gap 36 is defined between the ends of the C-shaped arrangement 35. The first rollers 32 are arranged one after the other so as to form an open curvilinear line, i.e. the C-shaped arrangement, around the longitudinal axis A. The gap 36 is defined between the first roller 32 placed at the start point of the open curvilinear line and the first roller 32 placed at the end point of the open curvilinear line. In other words, the gap is defined between the "first" first roller 32 of the open curvilinear line and the "last" first roller 32 of the open curvilinear line.

In the embodiment shown (FIG. 4), the first folding rollers 32 comprises a first roller 32a, a second roller 32b and a third roller 32c, the second roller 32b being interposed between the first roller 32a and the third roller 32c. In this case, the ends of the C-shaped arrangement 35 are defined by the first roller 32a and the third roller 32c.

The second folding roller 33 is arranged at the gap 36 of the C-shaped arrangement 35.

Since the second longitudinal axis D is spaced apart from the first longitudinal axes C, the second folding roller 33 can guide the tube 10 without closing the gap 36 of the C-shaped arrangement 35.

When the packaging machine 1 is working, the tube 10—filled with product to be packed—can be partially received within the gap 36 so avoiding an excessive compression of the tube 10 against the guiding device 30. In particular, the risk that the sheet of packaging material 3 forming the tube 10 is pinched between two adjacent first folding rollers 32, or between one of the first folding rollers 32 and the second folding roller 33, is highly reduced when compared to the known guiding devices.

In the embodiment shown, the guiding device is arranged at the sealing station 8. In particular, one of the first folding rollers 32, i.e. the first folding roller facing the overlapping area 16, cooperates with a pressing roller (not shown) arranged inside the tube 10, to press together the first longitudinal edge 11 and the second longitudinal edge 15 to form the longitudinal seal 14.

In the embodiment shown, the driving arrangement 34 is an eccentric driving arrangement.

The eccentric driving arrangement comprises a shaft 39 rotatably supported by a frame 40 of the packaging machine. In particular, the shaft 39 is rotatably supported by a wall of an aseptic chamber of the packaging machine.

In the embodiment shown, the shaft 39 is rotatably supported by a bracket 41 fixed to the frame 40.

The shaft comprises a first end 44 connected to an arm 45.

The second folding roller 33 is rotatably supported by the arm 45.

The shaft 39 also comprises a second end 42, opposite the first end 44, connected to a handle 43.

In another embodiment (not shown), the second end 42 may be connected to a motorized driving unit.

The shaft 39 has a rotation axis E that is parallel to, and spaced apart from, the second rotation axis D.

Figure 7:
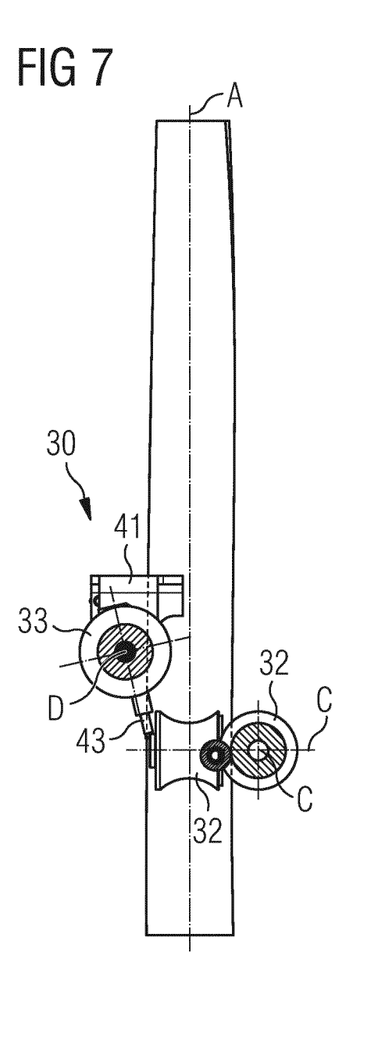
FIG. 7 is a section similar to the section shown in of FIG. 6, which shows the guiding device in a further working configuration.

In this way, when an operator rotates the shaft 39 around the rotation axis E—through the handle 43 or through the motorized driving unit—in a first rotation direction, the second folding roller 33 is moved towards the longitudinal axis A, i. e. towards the tube 10 (FIG. 7).

Figure 8:
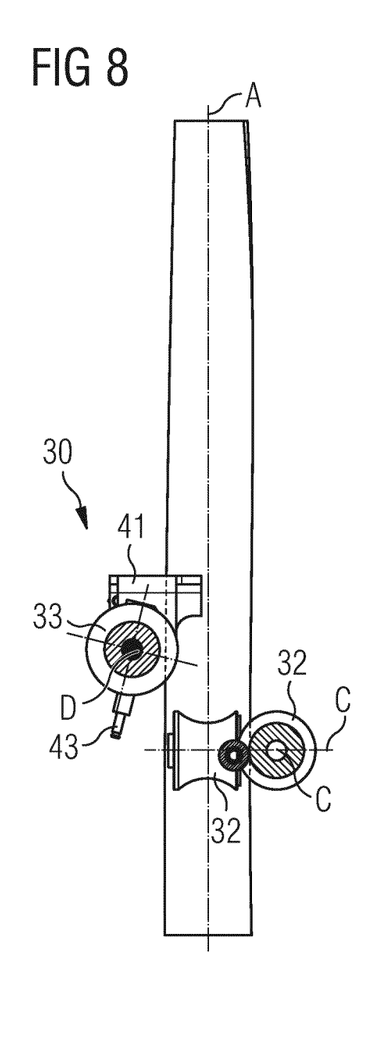
FIG. 8 is a section similar to the section shown in FIG. 6, which shows the guiding device in still further working configuration.

When the operator rotates the shaft 39 around the rotation axis E—through the handle 43 or through the motorized driving unit—in a second rotation direction, opposite the first rotation direction, the second folding roller 33 is moved away from the longitudinal axis A, i. e. away from the tube 10 (FIG. 8).

The eccentric driving arrangement is particularly advantageous since it allows controlling the extension of the overlapping area without entering the aseptic chamber.

The second end 42 of the shaft 39 (and the handle 43, or the motorized driving unit, connected thereto), in fact, is arranged outside the aseptic chamber, whilst the first end 44 of the shaft 39 (and the arm 45 connected thereto) are arranged inside the aseptic chamber. In this way, the operator can move the second folding roller towards or away from the axis A of the passage 31, i.e. towards or away from the tube 10, without the need to access the aseptic chamber and, therefore, without any risk of contamination of the aseptic chamber.

In an embodiment (not shown), the driving arrangement 34 is automatically driven by a motor device. In particular, the driving arrangement 34 may be feed-back controlled by the motor device. In this case, the guiding device 30 comprises a sensor which detects the extension of the overlapping area 16. If the extension of the overlapping area, as detected by the sensor, differs from the nominal extension of the overlapping area, the motor device—based on a signal generated by the sensor—actuates the driving arrangement so as to adjust the extension of the overlapping area and recover the offset.

During operation, the sheet of packaging material 3 is unwound off the reel 4 and fed along the forming path P. The sheet of packaging material 3 interacts with the folding assembly 7 and is folded so as to superimpose the first longitudinal edge 11 to the second longitudinal edge 15 and form the tube 10, not sealed longitudinally yet.

More specifically, the folding assembly 7 folds the sheet of packaging material 3 in such a way that the first longitudinal edge 11 is located radially outwards of the second longitudinal edge 15 with respect to the axis of the tube 10 still to be sealed longitudinally.

At the sealing station 8, the first longitudinal edge 11 is heated to melt the polyethylene layer, and the heat is transmitted by conduction from the first longitudinal edge 11 to the second longitudinal edge 15 to melt the polyethylene layer of the second longitudinal edge 15.

The first longitudinal edge 11 and the second longitudinal edge 15 are then pressed together so as to obtain the longitudinal seal 14 and longitudinally seal the tube 10.

The tube 10 is filled continuously with the pourable food product by the filling device 12, and is then fed through the jaw-type forming assembly (not shown) where it is gripped, transversely sealed, and cut along equally spaced cross sections to form a succession of packages 2.

During the above-described working phase of the packaging machine 1, an operator may vary—if needed—the extension of the overlapping area 16 through the driving arrangement 34.

In particular, the operator by moving the second folding roller 33 towards the axis A of the passage 31 can increase the extension of the overlapping area 16 and by moving the second folding roller 33 away from the axis A of the passage 31 can decrease the extension of the overlapping area 16.

Clearly, changes may be made to the guiding device described herein without, however, departing from the scope of the present invention.

In particular, the guiding device may be arranged upstream, or downstream, of the sealing station 8 instead of at the sealing station 8.

The invention claimed is:

1. A guiding device for guiding a sheet of packaging material in a packaging machine for producing sealed packages, the guiding device comprising:
    a plurality of folding rollers defining a passage for the sheet of packaging material, the passage having a longitudinal axis, wherein the plurality of folding rollers are configured to cause a first longitudinal edge of the sheet of packaging material to superimpose to a second longitudinal edge of the sheet of packaging material, opposite the first longitudinal edge, wherein the first longitudinal edge and the second longitudinal edge define an overlapping area having an extension,
    wherein the plurality of folding rollers include:
        a group of first folding rollers configured to rotate around first rotation axes arranged in a common first plane, and
        at least one second folding roller configured to rotate around a second rotation axis arranged in a second plane, different from the first plane, and
    a driving arrangement configured to move the at least one second folding roller towards and away from the longitudinal axis of the passage so as to control the extension of the overlapping area,
    wherein the first folding rollers define a C-shaped arrangement, a gap being defined between opposite ends of the C-shaped arrangement, the at least one second folding roller being arranged at the gap of the C-shaped arrangement.

2. The guiding device according to claim 1, wherein the first plane is parallel to the second plane.

3. The guiding device according to claim 2, wherein the first plane and the second plane are horizontal and are arranged at a preset distance from one another.

4. The guiding device according to claim 2, wherein the second plane is arranged upstream of the first plane along a forming path of the sheet of packaging material through the guiding device.

5. The guiding device according to claim 2, wherein the at least one second folding roller is arranged above the first folding rollers along a vertical direction.

6. The guiding device according to claim 1, wherein, when the first longitudinal edge is superimposed to the second longitudinal edge, the sheet of packaging material forms a tube, the at least one second folding roller being configured to interact with a portion of the tube opposite the overlapping area.

7. The guiding device according to claim 1, wherein, when the first longitudinal edge is superimposed to the second longitudinal edge, the sheet of packaging material forms a tube, the first folding rollers being rotatably supported by a supporting element surrounding the tube.

8. The guiding device according to claim 7, wherein the at least one second folding roller is rotatably supported by a supporting body connected to the supporting element.

9. The guiding device according to claim 1, wherein the driving arrangement is an eccentric driving arrangement.

10. The guiding device according to claim 9, wherein the eccentric driving arrangement includes a rotatable shaft having a first end connected to an arm, the at least one second folding roller being rotatably supported by the arm, the shaft having a rotation axis that is parallel to, and spaced apart from, the second rotation axis.

11. The guiding device according to claim 10, wherein the shaft further includes a second end, opposite the first end, connected to a handle or to a motorized driving unit.

12. The guiding device according to claim 1, wherein the driving arrangement is activated upon detection of the extension of the overlapping area.

13. The guiding device according to claim 1, wherein the guiding device is arranged at a sealing station of the packaging machine at which the first longitudinal edge is sealed to the second longitudinal edge to obtain a longitudinal seal.

14. The guiding device according to claim 13, wherein, when the first longitudinal edge is superimposed to the second longitudinal edge, the sheet of packaging material forms a tube, one of the first folding rollers, facing the overlapping area, presses together the first longitudinal edge and the second longitudinal edge to form the longitudinal seal.

\* \* \* \* \*